Patented Mar. 28, 1950

2,502,355

UNITED STATES PATENT OFFICE 2,502,355

NEW TETRACHLORETHYL ETHERS OF PHENOLS AND PRODUCTS OBTAINABLE THEREFROM AND THE USE OF THE LATTER PRODUCTS

Eduard Usteri, Basel, and Charles Graenacher, Riehen, Switzerland, assignors to Ciba Limited, Basel, Switzerland, a Swiss firm No Drawing. Application March 5, 1948, Serial No. 13,328. In Switzerland March 14, 1947

7 Claims. (Cl. 260—613)

It is known to make tetrachlorethyl ethers of the general formula

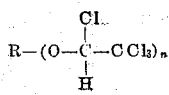

in which R represents an aliphatic, cycloaliphatic or araliphatic residue, and $n$ represents the number 1, 2 or 3, by condensing the corresponding alcohol with chloral, and subsequently chlorinating the hydroxyl group or groups with phosphorus pentachloride in accordance with the following scheme:

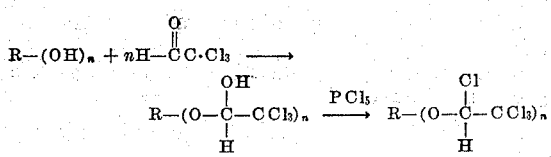

If the hydroxyl group or groups in the hydroxy-compound used as starting material are not of alcoholic but of phenolic character the reaction shown above does not take place because the chloral condenses in the aromatic nucleus carrying the hydroxyl group or groups.

According to the present invention hitherto unknown tetrachlorethyl ethers of phenols are made by treating a dichlorovinyl ether of the general formula

in which $R_1$ represents an aromatic residue, and $n$ is the number 1 or 2, with chlorine until the dichloro-vinyl double bond or bonds have been saturated.

The products so obtained are stable high boiling compounds capable of being distilled under reduced pressure without decomposition. 1 mol of hydrogen chloride can easily be split off by means of alcoholic alkali.

The dichlorovinyl ethers used as starting materials may be those of unsubstituted phenols or of substituted phenols of which the substituent or substituents are not affected by the action of chlorine in the cold. Accordingly, there may be used, for example, the dichlorovinyl ether of phenol, 4-nitrophenol, 4-acetylamino-phenol, a cresol, a methoxyphenol, 2-methyl-4-chlorophenol, 4-cyanphenol, 4-thiocyanphenol, 4-hydroxy-benzoic acid, hydroquinone, 4-bromophenol, para-hydroxydiphenyl, or a chlorinated phenol such, for example, as 2:4-dichloro-, 3:4-dichloro-2:4:5-trichloro- and above all para-chlorophenol, etc.

The resulting tetrachlorethyl ethers are generally excellent agents for combating animal pests. They are effective against the various stages of development of such pests, for example, as contact, food or respiratory poisons.

A very wide variety of materials can be protected against pests, and gaseous, liquid or solid materials can be used as carriers for the active substance. As materials to be protected or to serve as carriers there come into consideration, for example, air, and especially the air in rooms, and liquids, for example, the water in ponds, and finally any living or non-living solid substratum, for example, any desired objects in living rooms, in cellars, on plaster floors or in stables; also pelts, feathers, wool and the like; and furthermore organisms of the vegetable and animal kingdoms in all their various stages of development so long as they are not sensitive to the pest combating agents.

The combating of pests is carried out by the usual methods, for example, by treating the material to be protected with the tetrachlorethyl ethers in the form of vapour or in the form of dusting or spraying preparations, for example, as solutions or suspensions which are made up with water or organic solvents, for example, alcohol, petroleum, tar distillates and the like. Aqueous solutions or aqueous emulsions of organic solvents containing the active substance may also be used for brushing, spraying or dipping the objects to be protected. These solutions or emulsions should be capable of being atomised without causing any materially harmful effects on warm-blooded animals. In order to improve the wetting or adherent capacity of the preparations the usual wetting agents, for example, butyl-naphthalene sulfonic acid, fatty alcohol sulfonates or the like, or adherent agents, for example hardenable aminoplasts, among which are included hardenable carbamide or melamine resins which are water-soluble or of limited solubility in water, may be incorporated therewith. Furthermore, there may also be incorporated therewith, if desired, inert filling materials or identifying substances, for example, kaolin, gypsum or bentonite, or other additions such as sulfite cellulose waste liquor, cellulose derivatives and the like.

The tetrachlorethyl ethers may also be used in admixture with other pest-combating agents.

The insecticidal activity of a few tetrachlorethyl ethers, especially of the tetrachlorethyl ether of para-chlorophenol, will be clearly seen from the following tables:

I. PROLONGED CONTACT

The test animals were brought into contact with an accurately dosed coating of the active substance in Petri dishes of 10 centimetres diameter and continuously observed. The coating was produced by introducing an ethereal solution of the active substance in dish and allowing the solvent to evaporate.

(a) *Results with 0.1 milligram of active substances per square centimetre*

|  | Tetrachlorethyl ether of | | | |
|---|---|---|---|---|
|  | para-chloro-phenol | 2:4-Dichloro-phenol | 3:4-Dichloro-phenol | 2:4:5-Tri-chloro-phenol |
| *Musca domestica* | 15 minutes⊕ | 30 minutes⊕ | 30 minutes⊕ | 2 hours⊕. |
| *Tinea granella* | 1 hour⊕ | 6 hours⊕ | 1 hour⊕ | 5 hours⊕. |
| *Gnathocerus cornutus* | 4 hours⊕ | 5 hours⊕ | 4 hours⊕ | |
| *Phyllodromia germanica* | 24 hours+ | | 48 hours+ | |

(b) *Tests on flies with weak coatings of the tetrachlorethyl ether of para-chlorophenol*

[Test animals: *Musca domestica*.]

|  | 15 minutes | 1 hour | 24 hours |
|---|---|---|---|
| 0.1 milligram per cm.² | | ⊕ | + |
| 0.01 milligram per cm.² | | ⊕ | + |
| 0.001 milligram per cm.² | | ⊕ | + |

II. BRIEF CONTACT

Test animals: *Musca domestica*.

0.1 milligram of the tetrachlorethyl ether of para-chlorophenol per cm².

The animals were subjected for a limited time to action of the coating and thereafter further observed in clean dishes.

|  | 1 hour | 24 hours |
|---|---|---|
| 15 minutes brief contact | ⊕ | + |
| 5 minutes brief contact | ⊕ | + |
| 2 minutes brief contact | ⊕ | + |

SYMBOLS:
⊕ = Animals paralysed and lying on their backs.
+ = Animals dead.

The following example illustrates the invention, the parts being by weight:

60 parts of the dichlorovinyl ether of para-chlorophenol are dissolved in 80 parts of carbon tetrachloride. Chlorine is introduced into the solution while stirring mechanically and cooling with ice so that the temperature does not rise above 10° C. When the solution is completely saturated with chlorine it is allowed to stand for 8 days at room temperature. The chlorine in solution is then expelled by introducing air, the solution is washed with a dilute ice-cold solution of alkali, and the solvent is distilled off after the solution has been washed neutral. The tetrachlorethyl ether of para-chlorophenol is then distilled under reduced pressure over 4 parts of potassium carbonate. It boils at 169–171° under a pressure of 16 mm. in the form of a colourless oil. The yield is approximately quantitative.

In an analogous manner there are obtained:

The tetrachlorethyl ether of 2:4-dichlorophenol boiling at 185–188° C. under 13 mm. pressure The tetrachlorethyl ether of 3:4-dichlorophenol boiling at 180–183° C. under 12 mm. pressure The tetrachlorethyl ether of 2:4:5-trichlorophenol boiling at 140–143° C. under 0.08 mm. pressure.

Having thus disclosed the invention, what is claimed is:

1. A tetrachlorethyl ether of a phenol of the general formula

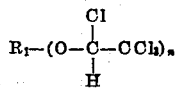

wherein $R_1$ represents a radical of the benzene series and $n$ stands for a whole number smaller than 3.

2. A tetrachlorethyl ether of a phenol of the general formula

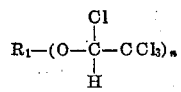

wherein $R_1$ represents a substituted radical of the benzene series and $n$ stands for a whole number smaller than 3.

3. A tetrachlorethyl ether of a phenol of the general formula

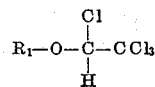

wherein $R_1$ represents a substituted radical of the benzene series.

4. A tetrachlorethyl ether of a phenol of the general formula

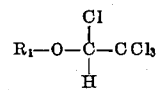

wherein $R_1$ represents a radical of the benzene series substituted by at least one and at most two chlorine atoms.

5. The tetrachlorethyl ether of para-chlorophenol of the formula

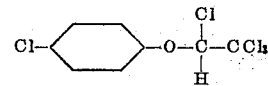

6. The tetrachlorethyl ether of 2:4-dichlorophenol of the formula

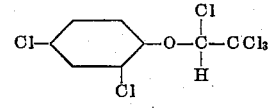

7. The tetrachlorethyl ether of 3:4-dichlorophenol of the formula

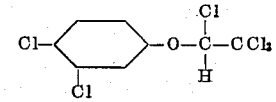

EDUARD USTERI.
CHARLES GRAENACHER.

REFERENCES CITED

The following references are of record in the file of this patent:

McElvain et al., J. A. C. S., 67, 650–3 (1945).
McBee et al., Ind. & Eng. Chem., 39, 412–15 (1947).